No. 732,578. PATENTED JUNE 30, 1903.
L. MURPHY.
LIQUID LEVEL INDICATOR.
APPLICATION FILED MAR. 24, 1903.
NO MODEL.
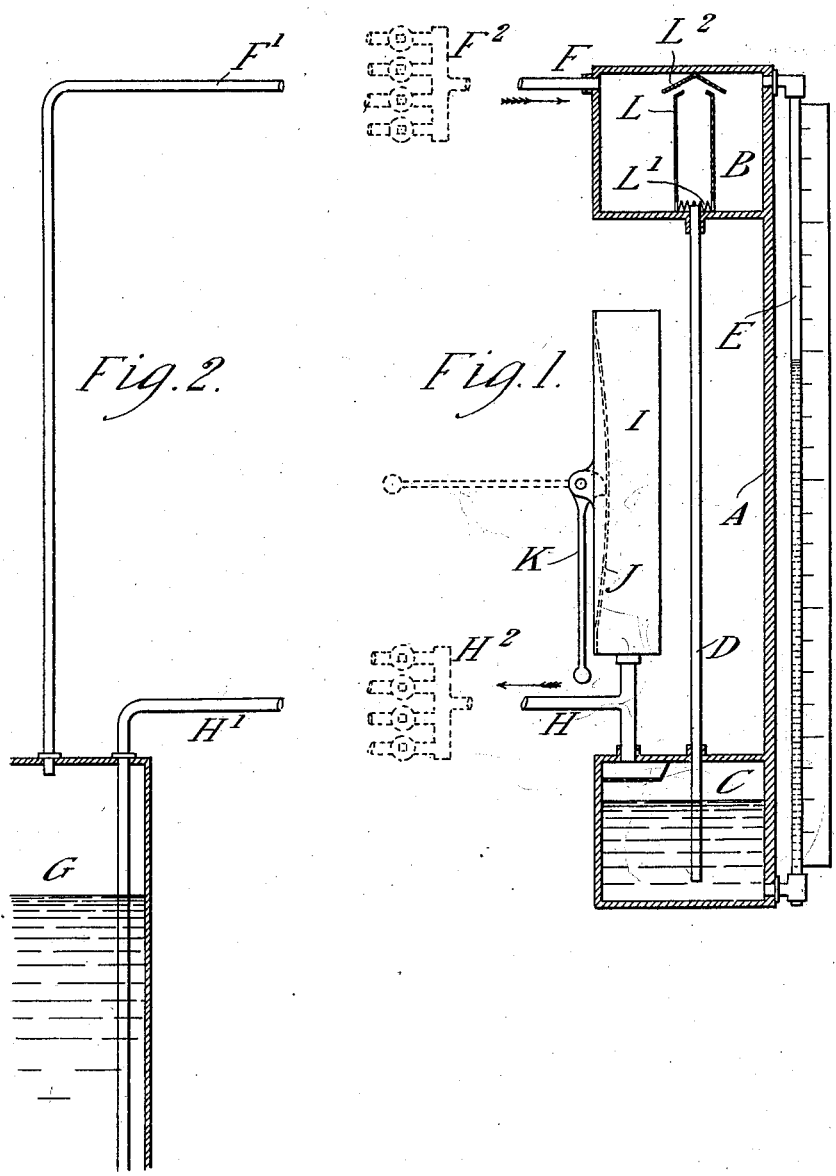

No. 732,578. Patented June 30, 1903.

UNITED STATES PATENT OFFICE.

LEONARD MURPHY, OF DUBLIN, IRELAND.

LIQUID-LEVEL INDICATOR.

SPECIFICATION forming part of Letters Patent No. 732,578, dated June 30, 1903.

Application filed March 24, 1903. Serial No. 149,342. (No model.)

*To all whom it may concern:*

Be it known that I, LEONARD MURPHY, distiller, a subject of the King of Great Britain, residing at Lizzieville, Richmond road, Dublin, Ireland, have invented certain new and useful Improvements in Liquid-Level Indicators, (for which I have made application for a patent in Great Britain, No. 4,166, dated February 21, 1903,) of which the following is a specification.

In the specification to my British Patent No. 15,275 of 1897 I described an apparatus for indicating the depth of liquid in closed vessels consisting of a U-shaped tube filled with liquid one limb of which was connected by a pipe to the top of the said closed vessel, while a pipe extending upward from near the bottom of the interior of the vessel through the top thereof was connected to the other limb of the U-tube. To this pipe was connected the discharge of an air-pump by means of which outer air was forced into the said pipe, whereby, on the one hand, the liquid was forced downward in the immersed part of the pipe in order to allow the air to bubble up through the liquid to the space above it in the vessel, and, on the other hand, the liquid contained in the U-shaped tube was forced upward in the limb connected to the top of the closed vessel to a height corresponding to that of the column of liquid displaced in the immersed portion of the pipe, so that the height to which the liquid was thus raised in the U-tube indicated the depth of liquid contained in the vessel. This arrangement of apparatus was subject to several disadvantages, such as that by forcing outer air in the closed vessel, on the one hand, the pressure therein would be increased at each pumping action, which might be undesirable, and, on the other hand, such air in bubbling up through the liquid or in mixing with the gases or vapors contained in the vessel might produce a detrimental action on the liquid or gases therein.

My present improved construction of such indicating apparatus has for its object to avoid the above-named and other disadvantages; and it consists mainly in so constructing the apparatus that for producing the gaseous pressure required for raising the liquid column in a gage-glass to a height corresponding to the depth of liquid in the closed vessel no fresh air is introduced into the latter by a pump, the air or gas in the vessel itself being utilized for this purpose, while the use of a pump with valves is avoided, and no increase of the pressure in the closed vessel is produced by the working of the apparatus.

The construction of the said improved apparatus is as follows: Two closed chambers, the one being situated a certain height above the other and of which the lower one is more or less filled with liquid, communicate with each other, first, by a tube extending from the bottom of the upper chamber down into the lower chamber to near the bottom thereof, and, secondly, by a tubular glass gage extending from the bottom of the lower chamber to the top of the upper one. The latter chamber also communicates at the top by a pipe with the top of the closed vessel the depth of liquid in which requires to be indicated, and the lower vessel is connected at top to a pipe leading down through the top of the closed vessel to near the bottom of the interior thereof, so as to be immersed in the liquid therein. This pipe communicates by a branch with a closed chamber filled with air or other gas so constructed that its capacity can be alternately reduced and enlarged, such as by forming one of its sides as a flexible diaphragm that is pressed inward by a hand-lever for reducing the volume and is allowed to spring outward again for increasing the volume.

I will describe the action of the said apparatus with reference to the accompanying diagrammatic drawings, in which—

Figure 1 shows a vertical section of the indicating apparatus, and Fig. 2 a vertical section of a closed vessel the depth of liquid in which is to be ascertained by the said apparatus.

To a suitable support A are fixed the upper closed chamber B and the lower closed chamber C, the latter being partly filled with liquid. These chambers communicate with each other, first, by a tube D, extending from the bottom of B down through the top of C and into the liquid therein, and, secondly, by the tubular glass gage E, extending from the bottom of C to the top of B.

The latter communicates by a branch pipe F with a pipe F', Fig. 2, connected to the top of the closed vessel G the depth of liquid in which is to be ascertained, and the chamber C communicates by a branch pipe H with a pipe H', leading through the top of the vessel G down to near the bottom thereof, so as to be immersed in the liquid therein. Communicating with pipe H, and consequently with chamber C, is a third chamber I, which I will term "compressor," being a closed vessel the capacity of which can be alternately reduced and enlarged by any suitable means, such as by a piston or by a flexible diaphragm, the latter device being shown on the drawings. The diaphragm J is arranged with spring action, so that it can either be pressed inward, as shown in dotted lines, by bringing the cam-lever K into the position shown in full lines, or it can spring outward on raising the lever K into the dotted position, the capacity of I being thereby respectively reduced and enlarged.

The apparatus operates as follows: When it is not in use, the lever K is held in the dotted position, the capacity of the compressor I being expanded. When it is desired to ascertain the depth of liquid in the vessel G, the diaphragm J is pressed inward, whereby a corresponding amount of air or gas will be forced out of it under a certain pressure and will pass partly through pipe H H' into vessel G, depressing the column of liquid in the immersed part of H' and eventually bubbling up through the liquid into the space above the latter. At the same time another portion of the air expelled from I will enter chamber C, and in pressing upon the liquid thereon will force a portion thereof up the gage-glass E to a height that will obviously correspond exactly with that of the column of liquid that has resisted the escape of air from the open end of the immersed part of pipe H', so that such height of the column of liquid in the gage-glass will represent the depth of liquid in vessel G. It will be seen that a portion of the liquid in C will also be forced up to a corresponding height in the pipe D, so that if this were made of glass it might serve as the tubular gage and the gage E be dispensed with; but I prefer to use the latter, as by its arrangement it affords a greater range of measurement than pipe D. If after taking the observation, as described, the compressor I be expanded again by raising lever K, air will be drawn into it from chamber C, causing air to be drawn down into it from chamber B through pipe D, while at the same time a corresponding quantity of air will pass from the upper space in vessel G through pipe F F' into chamber B to make good the quantity withdrawn therefrom, and it will be evident that this quantity will be the same as that which had previously entered vessel G through pipe H H', so that no increase of pressure is effected in vessel G by the above operation and no fresh air or gas is introduced into the same from the outside. Of course by the expansion of the compressor and consequent reduction of pressure in C the liquid column in the gage-glass will descend into C again, and also the liquid of vessel G will rise up in the immersed portion of pipe H' again, and the apparatus will thus have assumed its original condition again.

In the event of pipe H H' becoming choked from any cause then on the compressor I being contracted for the purpose of taking an observation the air or gas expelled in being wholly forced into chamber C will cause the liquid thereof to be forced up pipe D and gage-glass E into chamber B; but on expanding I again such liquid would all flow back into C again through pipe D, and thus no loss of the liquid would occur by a portion thereof finding its way into pipe F F', which would destroy the accuracy of the indications. In the event of the liquid-level in C being forced down so low under the last-named conditions that the lower end of pipe D is uncovered a portion of the air from I might also be forced up into chamber B, and in more or less scattering the liquid therein might cause some of it to enter pipe F F'. In order to prevent this, I provide a suitable baffle device either over the opening of pipe D or over that of pipe F, that will allow any air passing up pipe D to escape into F, but will prevent any of the liquid doing so. In the drawings such baffle consists of a tube L, open at both ends, placed over the opening of pipe D. The lower end L' is serrated to allow liquid to pass into it, while over the upper end is placed a conical deflector $L^2$, so that any liquid carried up by the air issuing from pipe D would be separated from the air by being deflected by the cone $L^2$ onto the surface of the liquid already in the upper chamber. A perforated baffle is also provided in chamber C under the opening of pipe H in order to prevent any liquid from being carried up into that pipe by the air entering from pipe D.

As described in my said British Patent No. 15,275 of 1897, the indicating apparatus may be adapted for indicating the depth of liquid in several closed vessels, such as G, by connecting the pipes H and F to any number of branch pipes, such as shown in dotted lines at $H^2$ and $F^2$, each leading to a separate vessel and each closed by a stop-cock, so that on opening one of these the corresponding vessel is made to communicate with the indicating apparatus for taking an observation.

It will be seen that the apparatus will operate correctly no matter what may be the pressure existing in the vessel the depth of liquid in which is to be indicated and also no matter what its position may be relatively to the latter.

Having thus described the nature of this invention and the best means I know of carrying the same into practical effect, I claim—

1. In apparatus for indicating the depth of liquid in closed vessels, the combination of an upper closed chamber, a pipe leading therefrom to the top of a vessel the depth of whose liquid is to be ascertained, a lower closed chamber partly filled with liquid and connected to a pipe leading down through the liquid of said vessel to near the bottom of its interior, a gage-tube connecting said upper chamber with the part of said lower chamber containing the liquid, and a third closed chamber connected to the top of the lower chamber and adapted to have its capacity alternately reduced and enlarged, so as at one time to force air under pressure into the lower chamber and through its pipe connection with said closed vessel, and at another time to draw air from the upper chamber and from the pipe connecting this with the top of said closed vessel, substantially as and for the purpose described.

2. In apparatus for indicating the depth of liquid in closed vessels, the combination of an upper closed chamber B connected by pipe F F' with the top of a vessel G the depth of whose liquid is to be ascertained, a lower chamber C partly filled with liquid and connected to a pipe H H' leading down through the vessel G to near the bottom thereof, a tube D extending from the bottom of chamber B down into the liquid contained in chamber C, a tubular gage-glass E extending from the top of chamber B to the bottom of chamber C, and a chamber I communicating with chamber C and with pipe H H', and adapted to have its capacity alternately reduced and enlarged, substantially as and for the purposes described.

In testimony whereof I have hereunto set my hand in presence of two subscribing witnesses.

LEONARD MURPHY.

Witnesses:
JAMES MURPHY,
DANIEL F. CRONIN.